United States Patent [19]

Stout

[11] Patent Number: 4,822,157
[45] Date of Patent: * Apr. 18, 1989

[54] ELONGATE, ARCUATE MIRROR WITH LIGHTWEIGHT, AERODYNAMIC BACK SUPPORT

[75] Inventor: Thomas R. Stout, Lambertville, Mich.

[73] Assignee: Safety Cross Mirror Co., Inc., Lambertville, Mich.

[*] Notice: The portion of the term of this patent subsequent to Mar. 15, 2005 has been disclaimed.

[21] Appl. No.: 102,619

[22] Filed: Sep. 30, 1987

[51] Int. Cl.$^4$ .......................... B60R 1/08; B60R 1/06; G02B 7/18

[52] U.S. Cl. .................................. 350/629; 350/632; 248/479; D12/187

[58] Field of Search ............... 350/629, 631, 632, 627, 350/590, 600; 248/475.1, 476, 479, 480, 484; D12/187, 189

[56] References Cited

U.S. PATENT DOCUMENTS

| | | | |
|---|---|---|---|
| D. 293,903 | 1/1988 | Kolenda et al. | D12/187 |
| 3,063,344 | 11/1962 | Slate | 350/629 |
| 4,436,372 | 3/1984 | Schmidt et al. | 350/629 |
| 4,512,634 | 4/1988 | Stout | 350/632 |
| 4,715,701 | 12/1987 | Urban | 350/631 |
| 4,730,914 | 3/1988 | Stout | 350/629 |

FOREIGN PATENT DOCUMENTS

| | | | |
|---|---|---|---|
| 165101 | 12/1981 | Japan | 350/631 |
| 186553 | 11/1982 | Japan | 350/629 |

Primary Examiner—Jon W. Henry
Attorney, Agent, or Firm—Allen D. Gutchess, Jr.

[57] ABSTRACT

An elongate, arcuate mirror is provided with a lightweight, aerodynamic back support and is particularly designed for use with school busses. One of the mirrors is located above each front fender of the school bus to enable the driver to have visual access to the area in front of the bus hood as well as to the sides of the bus. The mirror has a transparent sheet with a generally convex surface and a generally concave surface, with a reflective coating preferably on the concave surface. The back support includes a thin, lightweight sheet having a generally convex side and a generally concave side with a backing rim conforming to the size and shape of a rim of the transparent sheet and being affixed thereto. The convex side of the back support provides a streamlined effect for the mirror, particularly when mounted on a front fender. The convex side also has an elongate groove therein with bracket means affixed thereto to receive a tubular member of a metal mounting support which mounts the mirror on the fender of the bus.

12 Claims, 2 Drawing Sheets

ELONGATE, ARCUATE MIRROR WITH LIGHTWEIGHT, AERODYNAMIC BACK SUPPORT

This invention relates to an elongate, arcuate mirror with a lightweight, aerodynamic back support.

The mirror embodying the invention preferably is of the type shown in my copending U.S. patent application Ser. No. 944,564, filed Dec. 22, 1986. The mirror is primarily designed for use with school busses but can have other applications where a large reflective view is desired with less distortion than mirrors heretofore known. For use with a school bus, one of the mirrors is mounted at each front corner on top of the fenders of the bus to provide the driver with visual access to the area in front of the bus which is hidden from direct view by the hood, as well as to the sides of the bus.

The mirror is made of a transparent sheet having a concave surface and a convex surface with a reflective layer on one of the surfaces. The sheet is of elongate, arucate shape as viewed from the top and has rounded, generally semi-circular ends as viewed from the front. A central portion of the sheet is curved with a substantially constant longitudinal radius and with a constant transverse radius which is longer than the longitudinal radius. End portions of the mirror sheet beyond the central portion are of generally segmental spherical shape, each with a radius about equal to the constant transverse radius. The unique shape of the mirror sheet provides a large, wide-angle reflective viewing area which is accomplished with less distortion than mirrors of a generally similar nature heretofore known.

The mirrors, when employed with school busses and similar vehicles, are mounted by tubular mounting supports on the corners of the front fenders of the busses. As such, the mirrors project into the wind and produce considerable wind resistance. This can affect the fuel efficiency of the bus and, more particularly, cause unwanted movement of the mirrors to the extent that visual acuity is adversely affected. The overall mirrors, particularly with metal backs as heretofore employed, can weigh a substantial amount, particularly when designed for viewing wide areas. This considerable weight can cause the mirror to move move readily because of vibrations. Further, the heavy mirrors can also inflict damage in the event of an accident.

The mirror in accordance with the invention has a lightweight, aerodynamic or streamlined back support which overcomes the disadvantages of mirrors heretofore known. The back support is made of a sheet of relatively thin plastic material which has a generally convex side and a generally concave side, with the convex side facing forwardly and providing an aerodynamic affect to reduce wind resistance of the mirror. The convex side of the back support has an elongate groove to receive a tubular mounting support mounted on the bus fender. The back support also preferably has brackets or clamps cooperating with the groove to affix the mounting support and also to enable adjustable movement of the mirror relative to an axis of the back support.

It is, therefore, a principal object of the invention to provide an elongate, arcuate mirror which achieves a greater reflective viewing area with less distortion and has a lightweight, aerodynamic back support.

Another object of the invention is to provide an elongate, arcuate mirror particularly for use with school busses which has a lightweight, aerodynamic back support.

Yet another object of the invention is to provide an elongate, arcuate mirror with a back support having a convex surface with an elongate groove therein cooperating with a bracket to receive a mounting support for the mirror.

Many other objects and advantages of the invention will be apparent from the following detailed description of a preferred embodiment thereof, reference being made to the accompanying drawings, in which.

Figure 1:
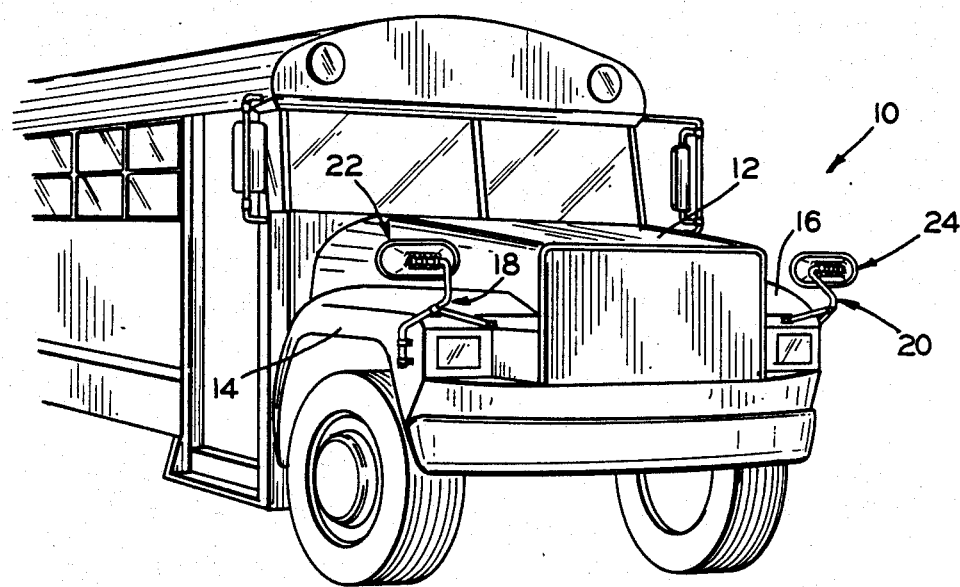
FIG. 1 is a somewhat schematic, fragmentary view in perspective of a school bus on which two mirror assemblies embodying the invention are mounted.

Referring to FIG. 1, a school bus indicated at 10 has a hood 12 and front fenders 14 and 16. The hood 12 often causes a large area in front of the school bus to be hidden from direct view by the driver and can hide a child. Mirror mounting supports 18 and 20 are affixed on front corner portions of the fenders 14 and 16. The supports can be generally similar to those shown in my U.S. Pat. No. 4,512,634. Elongate, arcuate mirror assemblies 22 and 24 are mounted on the supports 18 and 20 and are positioned so that the driver can see the hidden area in front of the school bus as well as areas along the sides of the school bus clearly and with minimal distortion.

The mirror assemblies 22 and 24 can be similar to one another. The mirror assembly 22 is shown more particularly in FIGS. 2–4 and includes an elongate, arcuate mirror 26 and a back support 28. The mirror 26 is comprised of a transparent sheet 30 preferably of suitable transparent plastic material, such as an acrylic, with a thickness in the order of one-eighth inch. The sheet 30 has an outer generally convex surface 32 and an inner generally concave surface 34. One of the surfaces, and preferably the inner surface 34, has a layer of a suitable reflective material with a protective coating of paint or the like applied over the back of that. The sheet 30 has a rim 36 extending around the entire periphery thereof to be attached to the back support 28. As viewed from the top (FIG. 2) the rim 36 is curved with a substantially constant radius throughout a central portion of the mirror 26 and has straight end portions beyond the central plane. As viewed from the back (FIG. 3), the rim 36 is straight at the central portion of the mirror and has generally semi-circular end portions at the ends of the mirror.

Figure 2:
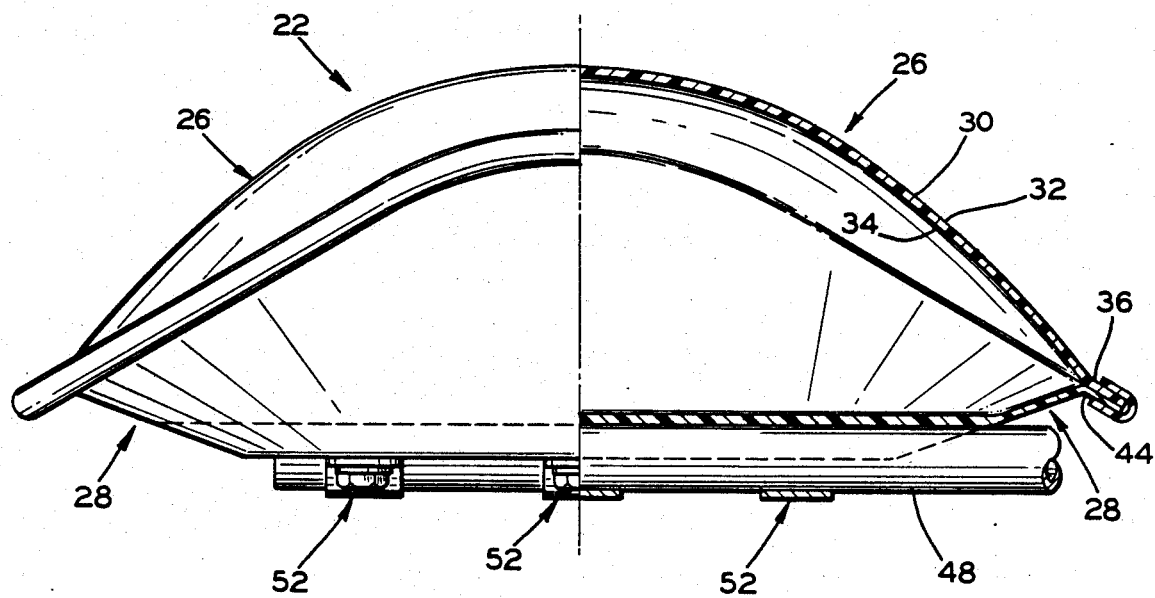
FIG. 2 is an enlarged top view, with half in section, of a mirror assembly including a back support mounted on a tubular mounting support.

The mirror 36 is symmetrical about a horizontal or longitudinal plane and about a vertical or transverse plane. A central portion of the mirror, as shown in FIG. 2, which extends about one-half of the overall peripheral length of the mirror, has a substantially constant longitudinal radius of a predetermined length. The central portion of the mirror also has a substantially constant transverse radius, as viewed in FIG. 4, which is of a predetermined value exceeding the value of the longitudinal radius.

Two end portions of the mirror 26 beyond the central portion have longitudinal radii which are substantially equal to the transverse radius of the central portion of the mirror. As such, the end portions of the mirror, having the same longitudinal and transverse radii, are of substantially segmental spherical shape. The shape of the mirror is discussed more specifically in my aforesaid copending patent application Ser. No. 944,564.

Figure 3:
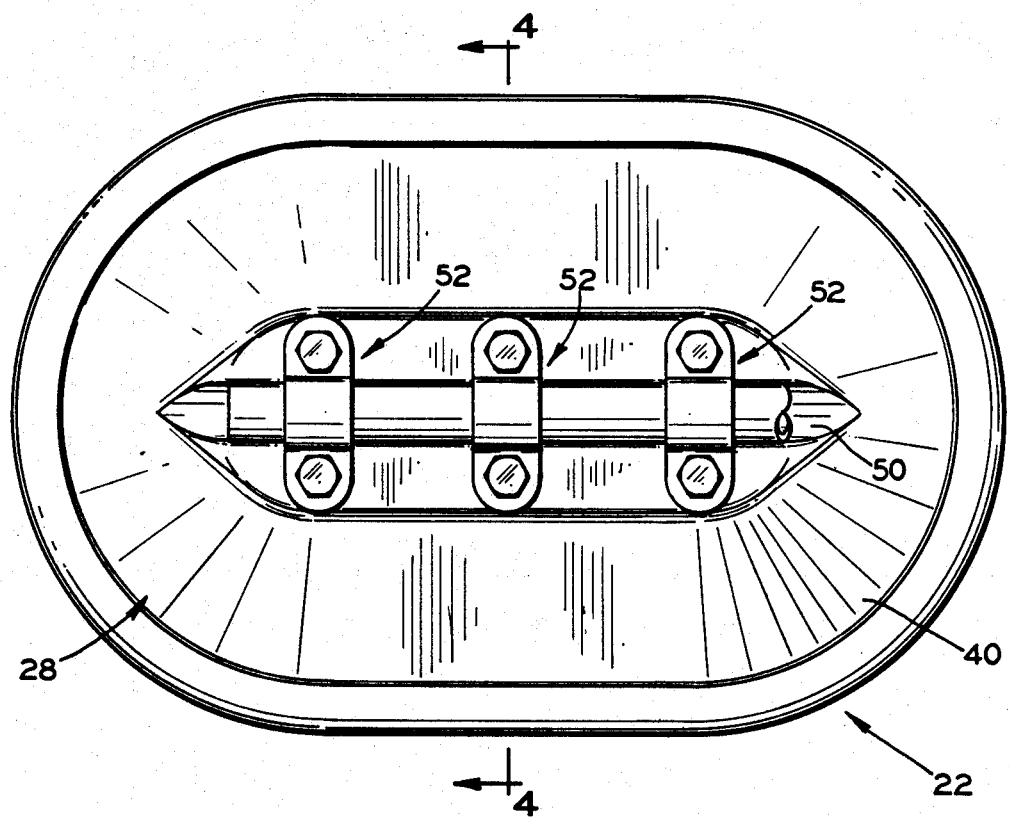
FIG. 3 is a back view in elevation of the mirror assembly.
Figure 4:
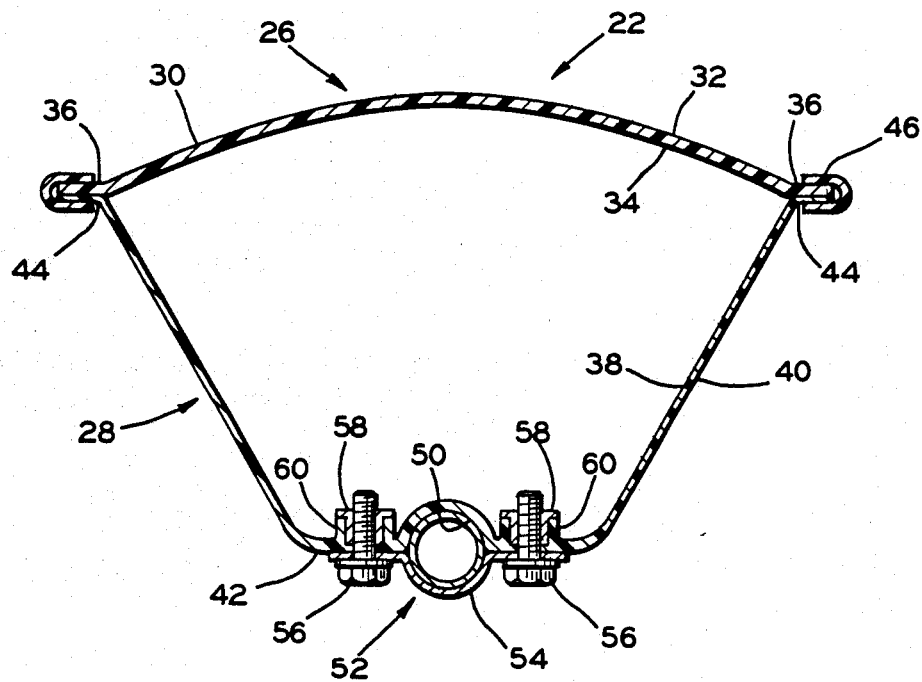
FIG. 4 is a view in transverse cross section taken along the line 4—4 of FIG. 3.

The back support 28 is made of a thin, tough, lightweight molded sheet material. It has a generally concave side 38 and a generally convex side 40. The convex side 40 has tapered sides and a flat outer portion 42. This shape, as best seen in FIGS. 3 and 4, provides an aerodynamic effect for the mirror assembly 22 to substantially reduce wind resistance. This is particularly important for the mirror assembly when used with a vehicle, and particularly a bus, since the mirror assemblies are mounted on the front corners of the bus out in the wind. Also, since they are relatively of large size, reduction of wind resistance is important. The wind resistance is important. The wind resistance reduction also reduces the unwanted movement of the mirrors caused by wind forces when the vehicle is in motion.

The back suport 28 has an outer rim 44 which conforms in size and shape to the sheet rim 36. As such, the support rim 44 is arcuate throughout a central portion and of constant radius, with end portions being straight and each lying in a common plane, as best viewed in FIG. 2. A clamping and sealing strip 46, of C-shaped configuration in transverse cross section, extends over both of the rims 36 and 40 and holds them securely together. A suitable adhesive can also be employed at this juncture, if desired.

The back support 28, being of a thin, lightweight sheet material, provides a substantial reduction in weight for the overall mirror assembly 22 or 24. By way of example, the mirror assembly with the lightweight back supports weighs one and one-half pounds versus six and one-quarter pounds for the same size mirror with a metal back, as shown in my aforesaid said copending application, for example.

The mounting supports 18 and 20 have suitable struts to conform with particular bus fender configurations. However, the supports in each case terminate in a horizontal elongate, tubular member 48 (FIGS. 2). The flat outer portion 42 of the back support 28 has an elongate groove 50 extending longitudinally and being of generally semi-circular configuration in transverse cross section. The groove has a radius equal to the outer radius of the tubular member 48. The groove 50 extends to the full length of the flat outer portion 42 of the backing member, as best shown in FIG. 3.

A plurality of clamps or brackets 52 (in this case three) are affixed to the flat portion 42 of the back support 28 at predetermined locations along the groove 50. Referring to FIG. 4, each of the clamps 52 include a strap 54 with a semicircular central portion and end flanges. The end flanges have openings through which machine screws 56 extend. These are threaded into nuts 58 which are molded into bosses 60 in the back support 28. When the screws 56 are loose, the mirror assembly 26 can be adjusted about a horizontal axis and, when tightened, fully clamp the tubular member 48 of the mounting support 18 in place. Because of the wide angle of view provided by the mirror 26, horizontal adjustment about a vertical axis of the mirror assemblies 22 and 24 is seldom necessary.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. A mirror assembly including an elongate, convex mirror comprising a transparent elongate sheet with a generally convex surface and a generally concave surface, said sheet having a reflective layer on the concave surface, said sheet having a substantially constant longitudinal radius of predetermined value throughout a central portion of said mirror, said sheet having a substantially constant transverse radius of a value exceeding the value of said longitudinal radius throughout the same central portion of said mirror, end portions of said sheet beyond said central portion to the ends thereof having generally segmental spherical shapes, said transparent sheet having a rim around the entire periphery thereof, said rim, as viewed from the top of the sheet, being arcuate with a constant radius substantially throughout the central portion of said sheet, said rim, as viewed from the top of the sheet, being straight at both end portions of said sheet with said rim at each end portion lying in a common plane, an elongate back support for said transparent sheet having a backing rim around the entire periphery thereof, said backing rim conforming in size and shape to said sheet rim, being arcuate throughout a central portion of said back support and having end portions, as viewed from the top of the back support, which are straight, with each end portion of said support rim lying in a common plane, means affixing said backing rim to said sheet rim, said back support having a generally convex side and a generally concave side, said concave side facing toward said concave surface of said transparent sheet, said convex side of said back support having means for receiving a mounting support for supporting said mirror.

2. A mirror assembly according to claim 1 characterized by said back support being of a thin, lightweight, sheet material.

3. A mirror assembly according to claim 1 characterized by said receiving means comprising an elongate groove in the convex side of said back support.

4. A mirror assembly according to claim 3 characterized by bracket means cooperating with said elongate groove for receiving an elongate member of said mounting support.

5. A mirror assembly according to claim 4 characterized by fastener means affixing said bracket means to said back support in a manner to enable adjustable movement of said mirror relative to said elongate member of said mounting support.

6. A mirror assembly according to claim 5 characterized by said fastener means including screws which are threaded into nuts which are molded into said back support.

7. A mirror assembly including an elongate, convex mirror comprising a transparent elongate sheet with a generally convex surface and a generally concave surface, said sheet having a reflective layer on the concave surface, said transparent parent sheet having a rim around the entire periphery thereof, said rim, as viewed from the top of the sheet, being arcuate with a constant radius substantially throughout the central portion of said sheet, said rim, as viewed from the top of the sheet, being straight at both end portions of said sheet with said rim at each portion lying in a common plane, an elongate back support for said transparent sheet having a backing rim around the entire periphery thereof, said backing rim conforming in size and shape to said sheet rim, being arcuate throughout a central portion of said back support and having end portions, as viewed from the top of the back support, which are straight, with each end portion of sadi support rim lying in a common plane, a clamping strip of C-shaped configruation in transverse cross section affixing said backing rim to said sheet rim, said back support having a generally convex side and a generally concave side, said concave side facing toward said concave surface of said transparent sheet, said convex side of said back support having means for receiving a mounting support for supporting said mirror.

8. A mirror assembly according to claim 7 characterized by said receiving means of said back support comprising an elongate groove formed in the surface of said convex side to receive a tubular member of the mounting support.

9. A mirror assembly according to claim 8 characterized by said receiving means further comprising bracket means cooperating with said elongate groove to clamp and hold said member therebetween.

10. A mirror assembly including an elongate, convex mirror comprising a transparent elongate sheet with a generally convex surface and a generally concave surface, said sheet having a reflective layer on the concave surface, said transparent sheet having a rim around the entire periphery thereof, said rim, as viewed from the top of the sheet, being arcuate with a constant radius substantially throughout the central portion of said sheet, said rim, as viewed from the top of the sheet, being straight at both end portions of said sheet with said rim at each end portion lying in a common plane, an elongate back support for said transparent sheet having a backing rim around the entire periphery thereof, said backing rim conforming in size and shape to said sheet rim, being arcuate throughout a central portion of said back support and having end portions, as viewed from the top of the back support, which are straight, with each end portion of said support rim lying in a common plane, means affixing said backing rim to said sheet rim, said back support having a generally convex side and a generally concave side, said concave side facing toward said concave surface of said transparent sheet, said concave side of said back support having an elongate groove formed in the surface thereof to receive a member of circular shape in transverse cross section of a mounting support.

11. A mirror assembly according to claim 10 characterized by said receiving means further comprising bracket means cooperating with said elongate groove to clamp and hold said member therebetween.

12. A mirror assembly according to claim 10 characterized by said means affixing said backing rim to said sheet rim comprising a clamping strip of C-shaped configuration in transverse cross section extending around both of said rims.

* * * * *

UNITED STATES PATENT AND TRADEMARK OFFICE
CERTIFICATE OF CORRECTION

PATENT NO. : 4,822,157
DATED : April 18, 1989
INVENTOR(S) : Thomas R. Stout

It is certified that error appears in the above-identified patent and that said Letters Patent is hereby corrected as shown below:

Column 1, line 22, change "arucate" to --arcuate--.

Column 1, line 44, change "consideable" to --considerable--.

Column 1, line 45, change "move" (2nd occurrence) to --more--.

Column 1, line 66, change "aeordynamic" to --aerodynamic--.

Column 4, line 59, claim 7, line 5, after "transparent", delete "parent".

Column 5, line 4, claim 7, line 18, change "sadi" to --said--.

Signed and Sealed this

Fourteenth Day of November, 1989

Attest:

JEFFREY M. SAMUELS

Attesting Officer     Acting Commissioner of Patents and Trademarks